United States Patent
Leighton

(10) Patent No.: US 10,990,572 B1
(45) Date of Patent: Apr. 27, 2021

(54) SCALABLE INDEXING SERVICE

(71) Applicant: Amazon Technologies, Inc., Seattle, WA (US)

(72) Inventor: Russell Leighton, Cabin John, MD (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 16/137,412

(22) Filed: Sep. 20, 2018

(51) Int. Cl.
  *G06F 7/00* (2006.01)
  *G06F 16/22* (2019.01)
  *G06F 16/13* (2019.01)
  *G06F 16/25* (2019.01)
  *G06F 16/27* (2019.01)
  *G06F 16/2457* (2019.01)

(52) U.S. Cl.
  CPC ........ *G06F 16/2272* (2019.01); *G06F 16/134* (2019.01); *G06F 16/24573* (2019.01); *G06F 16/254* (2019.01); *G06F 16/278* (2019.01)

(58) Field of Classification Search
  CPC .......... G06F 16/2272; G06F 16/24573; G06F 16/278; G06F 16/254; G06F 16/134
  USPC ................................... 707/600–899
  See application file for complete search history.

(56) References Cited

U.S. PATENT DOCUMENTS

2008/0155627 A1\* 6/2008 O'Connor .......... H04N 21/4788
  725/109

\* cited by examiner

*Primary Examiner* — Isaac M Woo
(74) *Attorney, Agent, or Firm* — Davis Wright Tremaine LLP

(57) ABSTRACT

An indexing service uses a distributed data storage service to store a file comprising a subset of a plurality of data points. The indexing service also stores metadata indicative of a range of keys associated with the data points, and a data structure comprising information indicative of a probability that the file comprises data points associated with a first key. A client device, in response to a query for data points associated with the first key, downloads the file based on the range of keys and the probability. The client device searches the downloaded file for data points associated with the first key.

20 Claims, 10 Drawing Sheets

US 10,990,572 B1

SCALABLE INDEXING SERVICE

BACKGROUND

Database indexes are used by database management systems to improve the efficiency of storing and retrieving data. An index may include copies of data stored in a database table and references to the locations in the database where that data is stored. Typically, the creation and management of indexes is an integral component of the database's architecture. However, database management systems are increasingly being called upon to handle very large amounts of data. In such circumstances, the generation, management, and use of indexes involves a variety of challenges for which conventional database management systems are not well suited.

BRIEF DESCRIPTION OF THE DRAWINGS

Various techniques will be described with reference to the drawings, in which.

DETAILED DESCRIPTION

Figure 1:
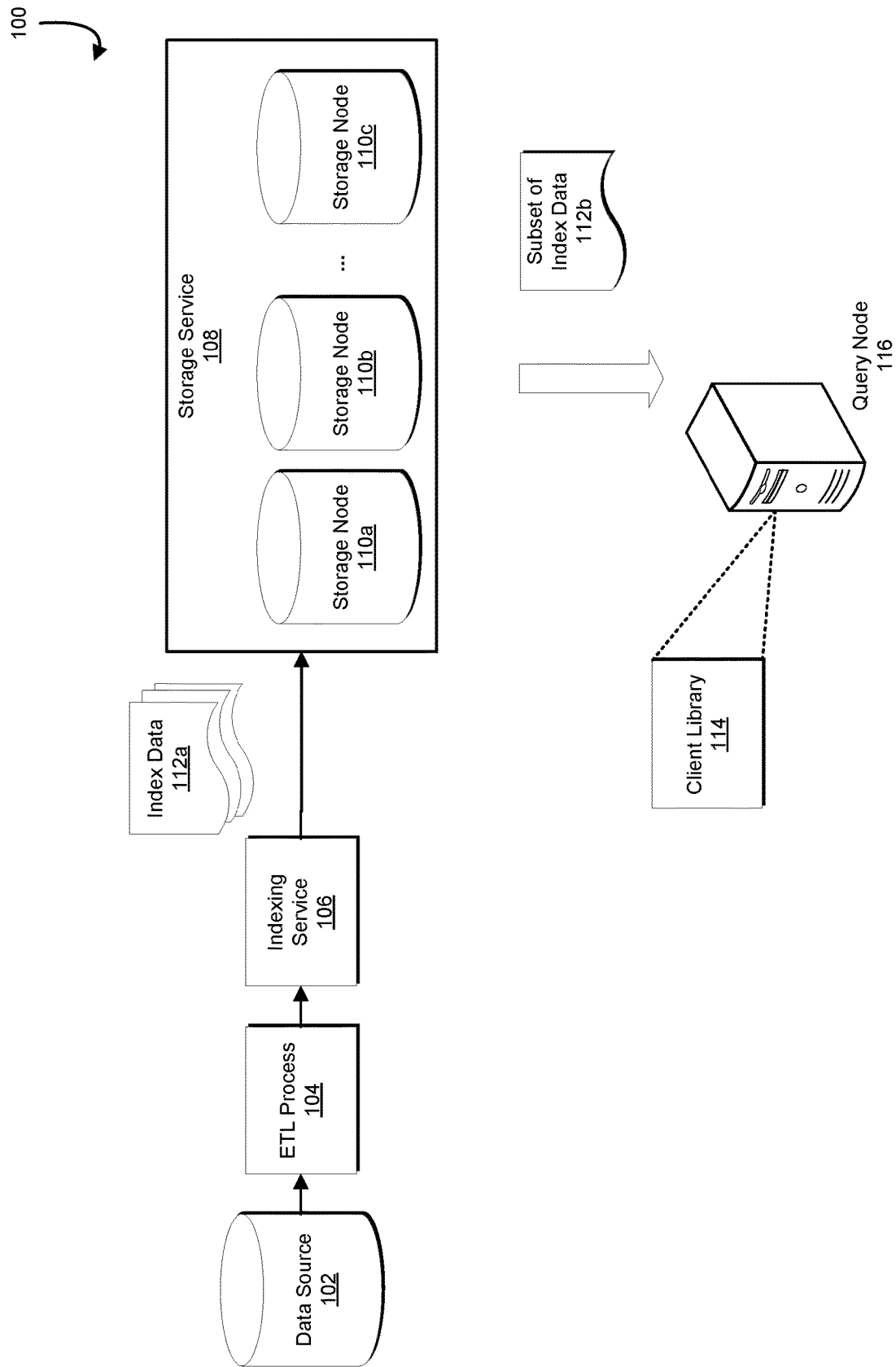
FIG. 1 is a block diagram illustrating an example of a system for executing point queries.

Examples of an indexing service are described. In one example, an indexing service generates index files specialized for targeted queries sometimes referred to as point queries. Each file contains data points for a portion of an index. The indexing service stores the files using a distributed data storage service that is also accessible to a client library executing on a client device. The files are identified on the distributed data storage service by the name of the index, a time interval, and a part number. The indexing service also stores, for each file, additional data that may be used to estimate whether or not an index file contains data relevant to a particular key. This information allows the client to efficiently identify, download, and search relevant index files.

In another example, a client executing a provided client library receives a query for data points associated with a key. The client library identifies, downloads, and searches index files determined to be likely to contain data points associated with the key. The determination is made by examining metadata describing the range of keys whose data points are stored in a file, and by using a data structure that indicates whether at least one data point associated with the key is likely to be included in the file. The client library maps downloaded files to virtual memory and searches the memory for data points associated with the key. The located data points are then added to the results of the query.

Embodiments of the present disclosure may be employed to improve processing of "point lookups," which are queries intended to be executed within a time-bounded window, and are typically directed to limited facets of available data. Point lookups are sometimes used for operations such as pivoting between data sets, performing drill-down operations, and so forth. Example applications include, but are not limited to, security monitoring systems that query very large repositories of log and telemetry data. Although conventional system may execute such queries with relative efficiency, considering the amount of being queried, they may not be well suited for scenarios such as security monitoring in which a rapid (e.g., sub-second) response is targeted.

Conventional key-value database may efficiently perform key-to-value lookups, e.g., retrieving values indexed by a key. However, such databases are not well suited to lookups of to the pattern key=>[$V_1, V_2 \ldots, V_N$], where the value of N is large. There are a variety of challenges to avoid scaling and operational issues when adapting key-value databases to handle lookups that conform to this pattern.

In various embodiments disclosed herein, an index service facilitates point lookups for the key=>[$V_1, V_2 \ldots, V_N$] pattern, including cases where the value of N is large. The embodiment separates data storage from compute services in order to enable independent scaling of each aspect. The embodiment comprises a distributed data storage service accessed via a client-side library for computing the results of a query. Use of the distributed data storage service permits the storage dimension to be scaled independently of other dimensions of capacity, such as compute or processing capacity. For example, the computing capacity needed to generate index files can be adjusted independently of the capacity needed to store the index files. Likewise, the capacity needed to process queries using those index files can be adjusted independently of the capacity used to generate and store them.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is a block diagram illustrating an example of a data storage and retrieval system, in accordance with an embodiment. In the example system 100 of FIG. 1, a data source 102 supplies data to an extract-transform-load ("ETL") process 104, which in turn supplies data to an indexing service 106. The indexing service 106 is a module executing on a computing device. As used herein, a module refers to a memory of a computing device and processor-executable instructions, at least some of which are loaded into the memory, and which when executed cause the computing device to perform the described functions of the module. The indexing service 106 may execute on a computing device, such as the application server 1008 depicted in FIG. 10.

The indexing service 106 writes index data 112a to a distributed data storage service 108. A distributed data storage service may comprise a plurality of storage nodes 110a-c, and may further comprise a control plane or other component for managing the operational aspects of the service 108, such as managing the addition of storage nodes to increase the available storage amounts. A storage service may further comprise on one or more application servers, such as those depicted in FIG. 10. These may comprise the control plane and software modules for storing and retrieving data from the storage nodes 110*a-c*.

When a query is performed by query nodes 116, a client library 114 causes a subset of the index data 112*b* to be downloaded to the query nodes 116. The client library 114 memory maps the subset of index data 112*b* and searches the mapped memory for data points that are compliant with the query.

A query node 116 is a computing device on which the compute portion of the query is performed. A query node 116 may be implemented on a computing device such as the client computing device 1002 or application server 1008 depicted in FIG. 10.

In an embodiment, the data source 102 is a database, such as a relational database or key-value database. However, the described techniques can be applied to a wide variety of application and circumstances, in addition to those where the data is obtained from a relational or key-value database system.

In an embodiment, the ETL process 104 is a module that extracts data for a desired index and feeds the data to the indexing service 106. The ETL process 104 may also apply various transforms to the extracted data in order to render the data to suitable format. The ETL process 104 may execute on a computing device, such as the application server 1008 depicted in FIG. 10.

The indexing service 106, in an embodiment, is a module that generates index data 112*a* for supporting point lookup queries. The indexing service 106 generates the index data 112*a* based on data input from the ETL process 104, and causes the data 112*a* to be stored the distributed data storage service 108.

In an embodiment, the data 112*a* generated by the indexing service 106 comprise an index file, min-max metadata, and a bloom filter. The min-max metadata and bloom filter are used to determine whether an index file is likely to contain at least one data point associated with a key. The min-max metadata, in an embodiment, is a file or a component of a file that stores the minimum value of a range of keys, and a maximum value of the range of keys. A bloom filter is a data structure that may be used to test whether a particular value is a member of a set of values. For example, keys $[K_1, K_2, \ldots K_n]$ can be added to a bloom filter, and the bloom filter can be subsequently used to estimate whether any one of those keys was added. Here, the bloom filter is used as a space-efficient data structure providing information indicating whether an index file is likely to contain at least one data point associated with a given key. The determination is not completely accurate, however. In particular, the bloom filter may provide false positives, but will not provide false negatives. A variety of alternative data structures may be employed in place of a bloom filter, provided they also have this guarantee against false negatives. For example, a variety of probabilistic data structures (of which bloom filters are one example) may be used.

In an embodiment, the index files are stored by the data service according to an index name, time bin, and part number. An index may be constructed to support a particular point query or class of point query, of the form $K \Rightarrow [V_1, V_2 \ldots, V_N]$, where the value of N is large. Each file related to this query may be associated with a name or other identifier. The data points $[V_1, V_2 \ldots, V_N]$ may be further subdivided by time intervals, and again by a part number. Each index file might therefore be identified by the tuple [name, time interval, part number]. One possible approach is to name each file according to the pattern "<name>@<time interval>@<part number>@index.dat."

An index file comprises data points indexed by key values. For example, consider the key-to-value mappings $K_1 \Rightarrow [V_1, V_2, V_3]$, $K_2 \Rightarrow [V_4, V_5, V_6]$, and $K_3 = [V_7, V_8]$. The index files $F_1$ and $F_2$ might comprise $F_1 = [V_1, V_2, V_3, V_7]$ and $F_2 = [V_4, V_5, V_6, V_8]$.

The min-max metadata comprises information indicative of the minimum and maximum values of the keys whose corresponding data points are stored in the index file. Note that the min-max metadata may not definitely indicate whether or not a file has data points associated with a particular key. Continuing the previous example, the min-max for $F_1$ would be $[K_1, K_3]$ since $F_1$ contains data points associated with $K_1$ and $K_3$, and the min-max for $F_2$ would be $[K_2, K_3]$ since F2 contains data points associated with $K_2$ and $K_3$.

A bloom filter is a probabilistic data structure sometimes used to determine whether a value is probably a member of a set of values. Testing for set membership with a bloom filter may produce false positives, but not false negatives. In other words, a bloom filter may indicate that a value is a member of a set when it is not a member, but will not indicate that a value is not a member of the set when the value is, in fact, a member. For example, a bloom filter $B_1$ associated with index file $F_1$ might or might not return positive when tested for $K_2$, but would always return positive when tested for $K_1$ or $K_3$.

The client library 114, executing on the query node 116, processes point-lookup queries of the form described above, e.g. of the form $K \Rightarrow [V_1, V_2 \ldots, V_N]$, where the value of N is large. The queries are processed using a client library 114, which downloads a selected subset of index data 112*b* to the memory of the query node 116. The selection is made, in an embodiment, based on the min-max metadata and bloom filter. The min-max data is tested initially, and if that test is positive, the bloom filter is checked. If these checks determine that an index file is likely to contain data associated with a particular key, the index file is downloaded. This process is repeated for each relevant index file.

In an embodiment, the client library 114 memory maps the downloaded index files into the memory of the query node 116. Memory mapping the file relies on the memory management features of the query node 116, such as those provided by the operating system and memory controllers, to map the contents of the file to an address space. For example, the contents of the file may be mapped to a virtual memory region. This approach has various advantages, such as leveraging the memory paging capabilities of the operating system to improve the efficiency of index files that are searched frequently.

In an embodiment, the client library 114 maintains a hit cache which tracks index files that have been downloaded to the query node 116 and are memory-mapped. By using this case, the client library 114 can avoid taking additional round-trips between the distributed data storage service 108 and the query node 116.

Although FIG. 1 depicts a single query node 116, embodiments may also employ a plurality of such nodes. For example, in an embodiment, a plurality of query nodes are implemented by a scalable compute service. The compute service may provide a number of computing nodes as appropriate for processing a set of point queries. Here, the number of computing nodes may be determined based on the central processing unit ("CPU") demands of the query and on the memory demands of the downloaded index files, such that an efficient proportion of the downloaded index files may be kept in paged-in memory.

Figure 2:
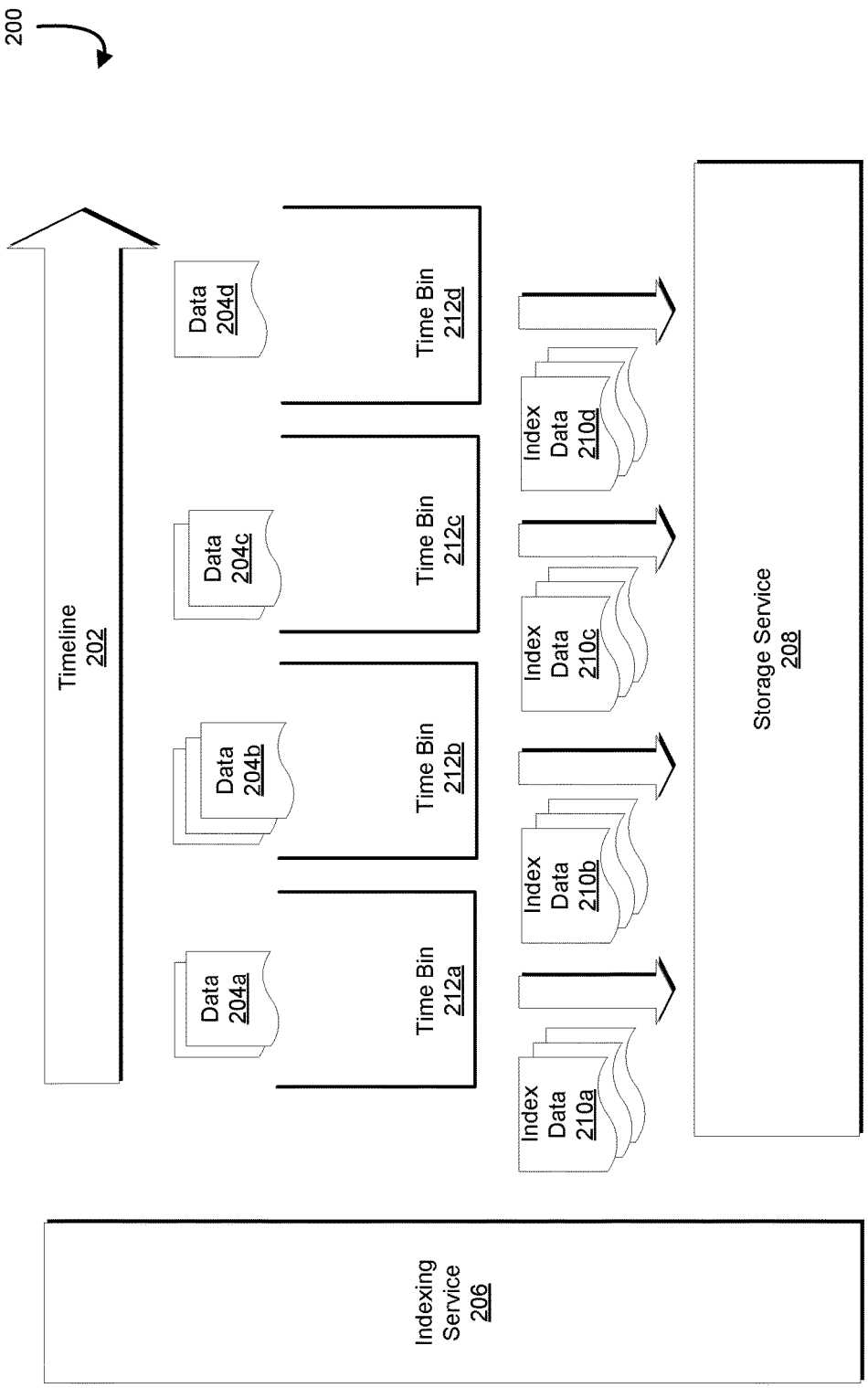
FIG. 2 is a block diagram illustrating an example of generating index data which is partitioned according to time.

FIG. 2 is a block diagram illustrating an example of generating index data which is partitioned according to time. In the example 200 of FIG. 2, an indexing service 206 (which may correspond to the indexing service 106 of FIG. 1) generates index data 210a-d that is partitioned according to a timeline 202. The indexing service 206 associates each of the data points in the received data 204a-d with a time bin 212a-d, and generates a corresponding set of index data 210a-d for each time bin 212a-d. The index data is stored on a storage service 208, which may correspond to the storage service 108 depicted in FIG. 1.

In an embodiment, the timeline 202 is based on the time the corresponding data was received. For example, data 204a might be received from midnight to 6:00 am, and be placed in a time bin 212a corresponding to the midnight to 6:00 am time period. Likewise, the data 204b might be received from 6:00 am to noon, and be placed in a time bin 212b corresponding to the 6:00 am to noon time period. The portion of the timeline 202 represented by a time bin 212a-d is referred to herein as an interval.

In another embodiment, the data 204a-d is sorted overtime 202 based on times associated with the data 204a-d, rather than the time the data was received. For example, a year-long record of stock market data might be divided into four time binds 212a-d, the first 212a associated with data points in Q1, the second 212b associated with data points in Q2, and so on.

More generally, FIG. 2 illustrates partitioning data 204a-d according to time intervals, and generating a set of index data 210a-d for each time interval. In an embodiment, at least one index file, min-max data, and bloom filter is constructed for each time interval. In a further aspect, the data for each time interval is further subdivided into parts, and a set of index data is generated for each part. Each part may be an arbitrary or random subdivision of data in the corresponding time bin, or may be based on a non-arbitrary subdivision, such as sub-intervals.

Figure 3:
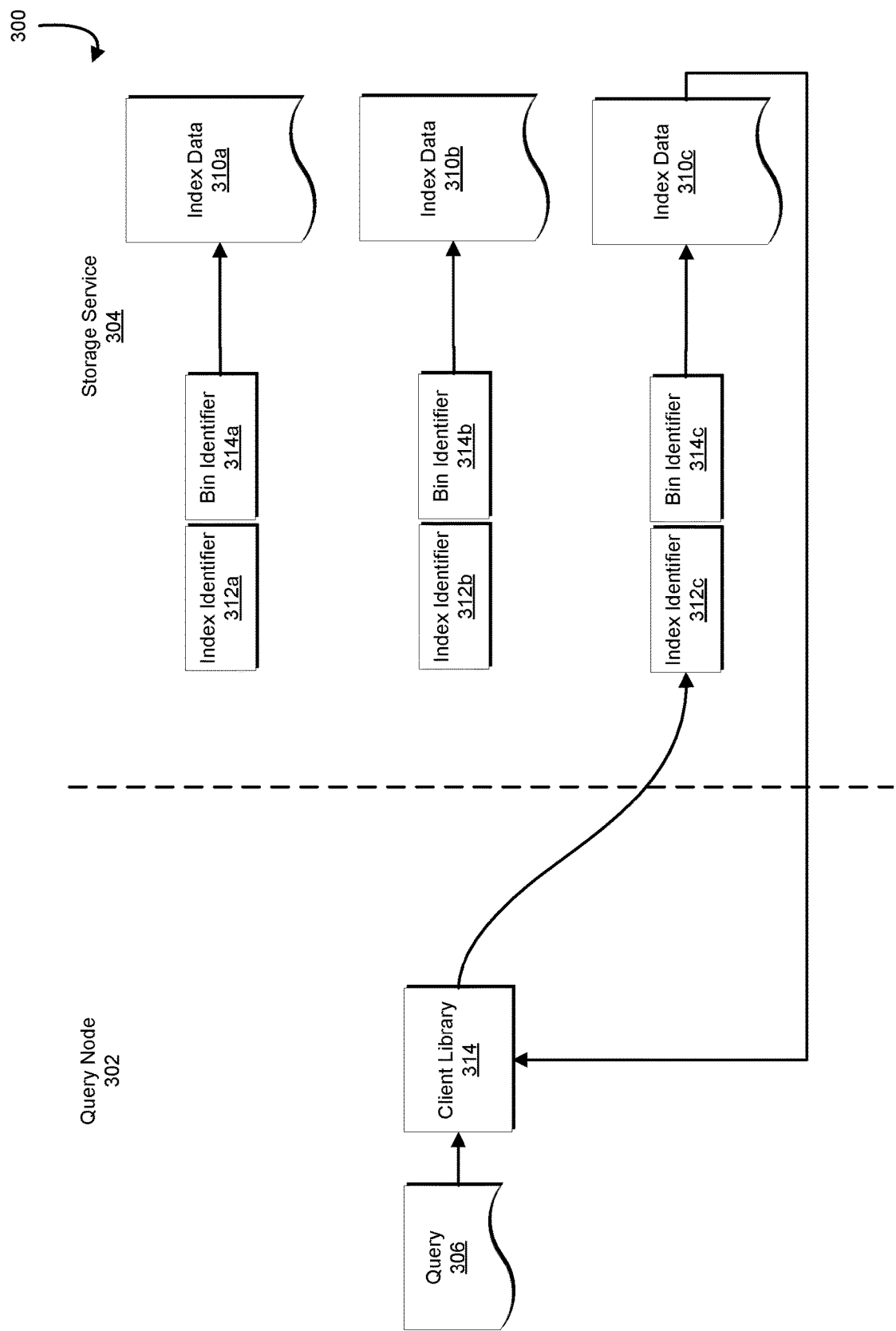
FIG. 3 is a block diagram depicting an example 300 of storing and retrieving index data.

FIG. 3 is a block diagram depicting an example 300 of storing and retrieving index data. The depicted query node 302, distributed data storage service 304, and client library 314 may correspond to the query node 116, distributed data storage service 108, and client library 114 of FIG. 1. The index data 310, in various cases and embodiments, includes min-max metadata, bloom filters, and index files. These components of the index data 310 may be downloaded individually or in combination.

In an embodiment, each unit of index data 310a-c corresponds to a partition of data, such as the time bins depicted in FIG. 2. In such cases, each set of index data 310a-c may be identified by a corresponding index identifier 312a-c and bin identifier 314a-c. Thus, a particular set of index data 310c might be identified by an index identifier 312c and a bin identifier 314c. In an embodiment, this is accomplished by naming the data according to a pattern, such as "<index identifier>.<bin identifier>.index.dat." To further illustrate, if an index was named "I1" and was partitioned according to quarterly time intervals, the distributed data storage service 304 might have stored on it (by the indexing service 106) files such as "I1.Q1.min-max.dat," "I1.Q1.bloom-filter.dat," and "I1.Q1.index.dat." More generally, data may be retrieved from the distributed data storage service 304 based on a tuple such as [I1, Q1, <type>]. In the example 300 of FIG. 3, the client library 314 retrieves index data 310c based on an index identifier 312c and a bin identifier 314c.

In an embodiment, the index identifier 312c and a bin identifier 314c are determined based at least in part on the query 306. For example, the index identifier 312c might correspond with or otherwise be derivable from the name of a table referenced in the query 306. The bin identifier 314c might, in some cases, be derivable from clause of the query that restricts the results based on an interval. In other cases, e.g. when the query is not restricted to a particular interval, the client library 314 may examine each bin by first checking min-max data to see if a bin's data might contain data points associated with the desired key, and then checking the bloom filter for the bin and downloading the index file if the bloom filter tests positive for the key.

In an embodiment, the distributed data storage service 304 can provide a directory listing. The directory listing can be used by the client library 314 to identify the bins that exist for a particular index. For example, a directory listing might produce the results:

I1.Q1.min-max.dat, I1.Q1.bloom.da, I1.Q1.index.dat
I1.Q2.min-max.dat, I1.Q2.bloom.dat, I1.Q2.index.dat
I1.Q3.min-max.dat, I1.Q3.bloom.dat, I1.Q4.index.dat It will be appreciated that the example above is intended to be illustrative, and as such should not be construed so as to limit the scope of the present disclosure to embodiments conforming to the provided example.

Continuing the example, in an embodiment the client library 314 derives the index name "I1" from the query, and then requests a directory listing from the distributed data storage service 304. From the directory listing, as seen above, the client library 314 may determine that index data exists for each of the time bins "Q1," "Q2," and "Q3." The client library 314 might then download the I1.Q1.min-max.dat file, test to see if this bin might contain any data for the corresponding key, then download the I1.Q1.bloom.dat file and test for the presence of the key, and then, assuming both of these tests were positive, download the file I1.Q1.index.dat.

Figure 4:
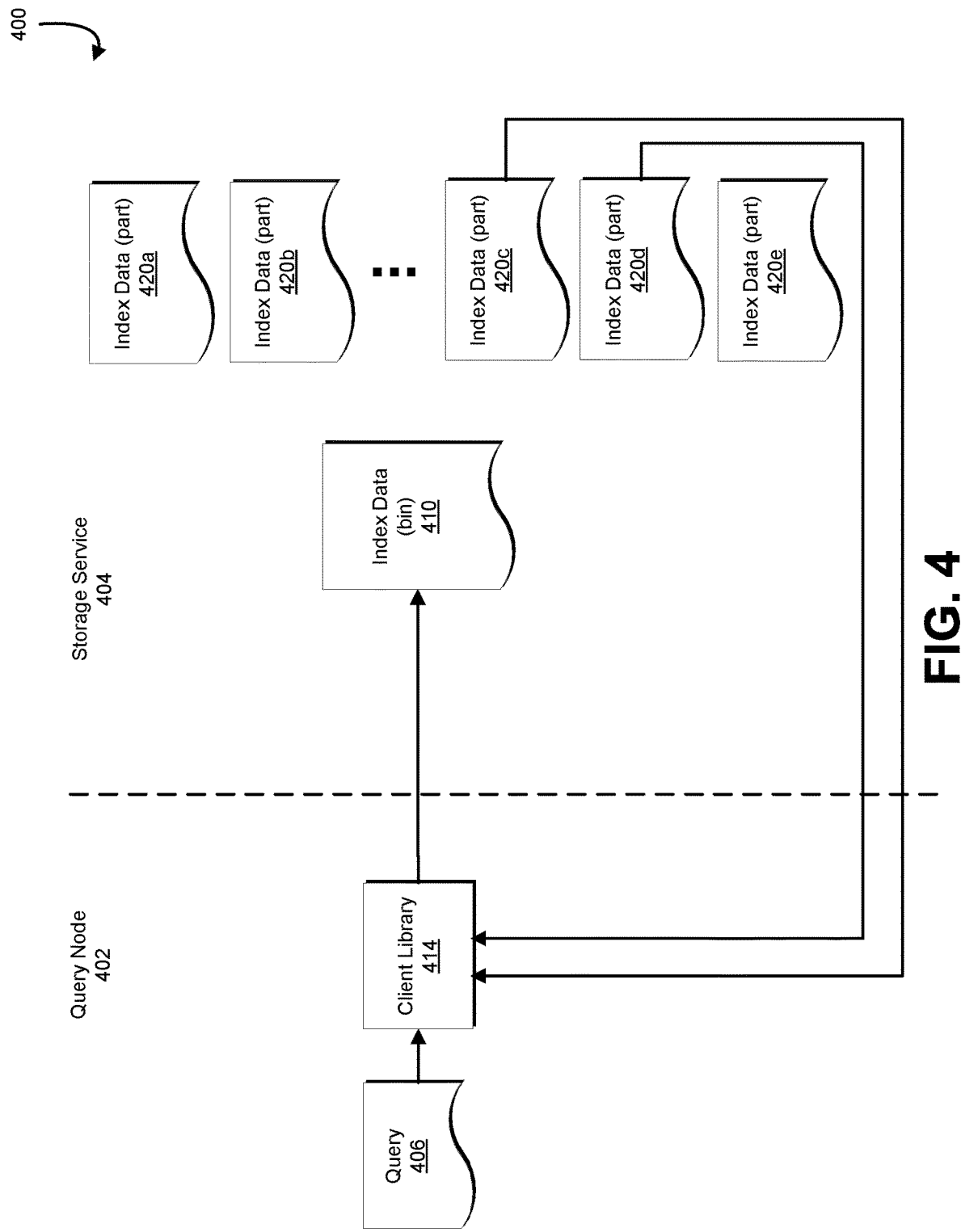
FIG. 4 is a block diagram depicting a further example of storing and retrieving index data.

In some cases and embodiments, data for a given bin is further subdivided into parts. This is depicted in FIG. 4, which is a block diagram depicting a further example 400 of storing and retrieving index data. The depicted query node 402, distributed data storage service 404, and client library 414 may correspond to the query node 116, distributed data storage service 108, and client library 114 of FIG. 1.

In the example 400 of FIG. 4, an indexing service, such as the indexing service 106 depicted in FIG. 1, has stored index data 410 as a collection of parts 420a-e. Embodiments may partition the index data 410 for a bin according to parts based on a variety of criteria. For example, in some cases the data 410 for the bin is partitioned according to further subdivisions of time. In other cases, the data 410 is arbitrarily partitioned. In still other cases, the data 410 is partitioned according to a hash of the keys. In still other cases, the data 410 is partitioned according to the order in which the data is processed. It will be appreciated that these examples are intended to be illustrative, and as such should not be construed so as to limit the scope of the present disclosure to only the specific examples provided.

In an embodiment, the distributed data storage service 404 can provide a directory listing (or other enumeration) for the stored files. For example, the directory listing might be:

I1.Q1.min-max.P1.dat, I1.Q1.P1.bloom.dat, I1.Q1.P1.index.dat

I1.Q1.min-max.P2.dat, I1.Q1.P2.bloom.dat, I1.Q1.P2.index.dat

I1.Q1.min-max.P3.dat, I1.Q1.P3.bloom.dat, I1.Q1.P3.index.dat

I1.Q2.min-max.P1.dat, I1.Q2.bloom.P1.dat, I1.Q2.index.P1.dat

I1.Q2.min-max.P2.dat, I1.Q2.bloom.P2.dat, I1.Q2.index.P2.dat

I1.Q3.min-max.P1.dat, I1.Q3.bloom.P1.dat, I1.Q3.index.P1.dat

I1.Q3.min-max.P2.dat, I1.Q3.bloom.P2.dat, I1.Q3.index.P2.dat

I1.Q3.min-max.P3.dat, I1.Q3.bloom.P3.dat, I1.Q3.index.P3.dat

It will be appreciated that the example above is intended to be illustrative, and as such should not be construed so as to limit the scope of the present disclosure to embodiments conforming to the provided example.

The client library 414 can determine to download data for a given part based on testing the part's min-max data and bloom filter for an indication that the part likely contains data for the key specified by the query 406.

Figure 5:
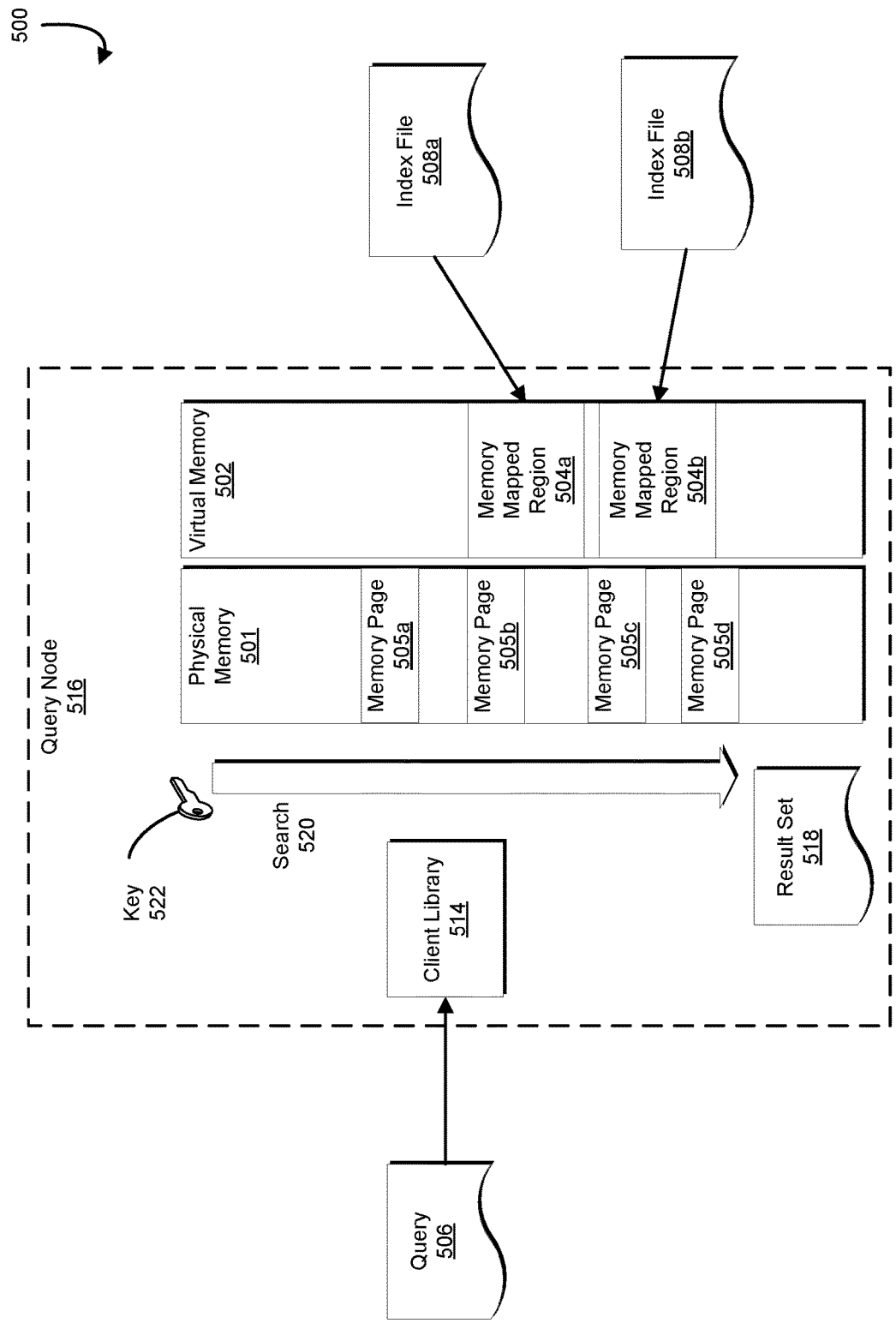
FIG. 5 is a block diagram depicting an example of searching index data.

FIG. 5 is a block diagram depicting an example of searching index data. The client library 514 and query node 516 may correspond to the client library 114 and query node 516 depicted in FIG. 1.

The example 500 of FIG. 5, the query node 526 performs a search 520 related to a query 506 of the form K=>[$V_1$, $V_2$ ..., $V_N$], where the value of N is large. Here, "K" may correspond to the key 522 depicted in FIG. 5, and [$V_1$, $V_2$ ..., $V_N$] may correspond to records located in the virtual memory 502 that are to be identified by the search 520.

As described herein, the client library 514 downloads index files and loads them into memory. In the embodiment of FIG. 5, the client library 514 has downloaded and memory-mapped the index files 508a-b. The index files 508a-b have been mapped to regions 504a-b of a virtual memory 502. These are, in turn, mapped to pages 505a-d of physical memory 501. This may, for example, be done using the memory management facilities of the operating system and memory controller of the query node 516.

In an embodiment, the client library 514 conducts the search by traversing the virtual memory regions 504a-b. The search may be further restricted based on a mapping of which regions 504a-b are known to hold, or suspected to hold, data for the key 522. This mapping may be referred to as a hit cache. As the search proceeds, the client library 514 appends data points corresponding to the key 522 to a result set 518. Appending the results may, for example, include adding the data points to a memory buffer. In another embodiment, a similar approach is employed, but based on tracking pages 505a-d of physical memory which hold or are suspected of holding data for the key 522.

As described herein, data for an index may be stored using a scalable distributed data storage service. Here, scalability refers to the ability of the distributed data storage service to add additional storage capacity. Note that, in contrast to traditional database architectures, the techniques described herein allow the storage component to scale independently of other performance dimensions, such as compute capacity.

Figure 6:
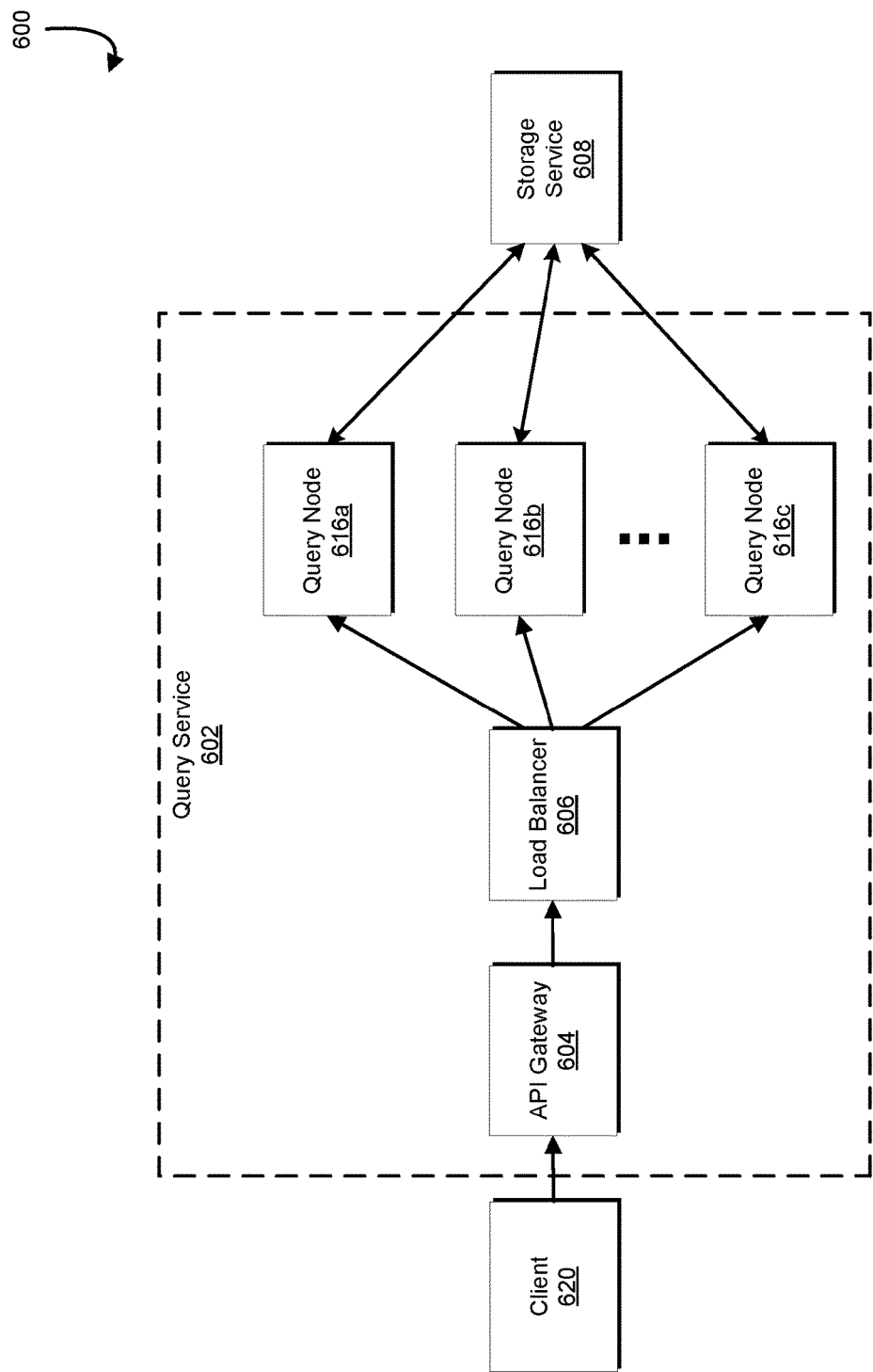
FIG. 6 is a block diagram depicting an example of scaling demand for compute capacity.

FIG. 6 is a block diagram depicting an example of scaling demand for compute capacity. In the example 600 of FIG. 6, a query service 602 processes queries sent from a client 620. The queries may be received by an API gateway 604 and then routed by a load balancer and central node 606 to one or more query nodes 616a-c.

In an embodiment, the API gateway 604 is a module executing on a computing device connected via a network, such as the Internet, to the client 620. For example, in an embodiment, the API gateway 604 comprises a web server that provides a web service interface through which the client 620 can submit queries.

The API gateway 604 forwards the query 620 to a load balancer 606. The load balancer 606, in an embodiment, is a module executing on a computing device that is a component of the query service 602. The load balancer 606 distributes workload for the query among the one or more query nodes 616a-c. If more than one of the query nodes 616a-c is used, the load balancer 606 can assemble result sets from each of the participating query nodes 616a-c, and provide, in response to the query, a combined result set to the client 620. Otherwise, the load balancer 606 may return the result set as generated by a selected individual query node 616a-c.

The query nodes 616a-c may operate independently or in a coordinated fashion to download index data from the distributed data storage service 608. In some cases and embodiments, each of the individual query nodes 616a-c download whatever index files are determined to be needed to process the queries directed to that node. The load balancer 606 can direct queries to nodes 616a-c based on the index files that are downloaded. In an embodiment, the load balancer 606 leverages the hit cache of each node 616a-c to determine where to route queries.

Figure 7:
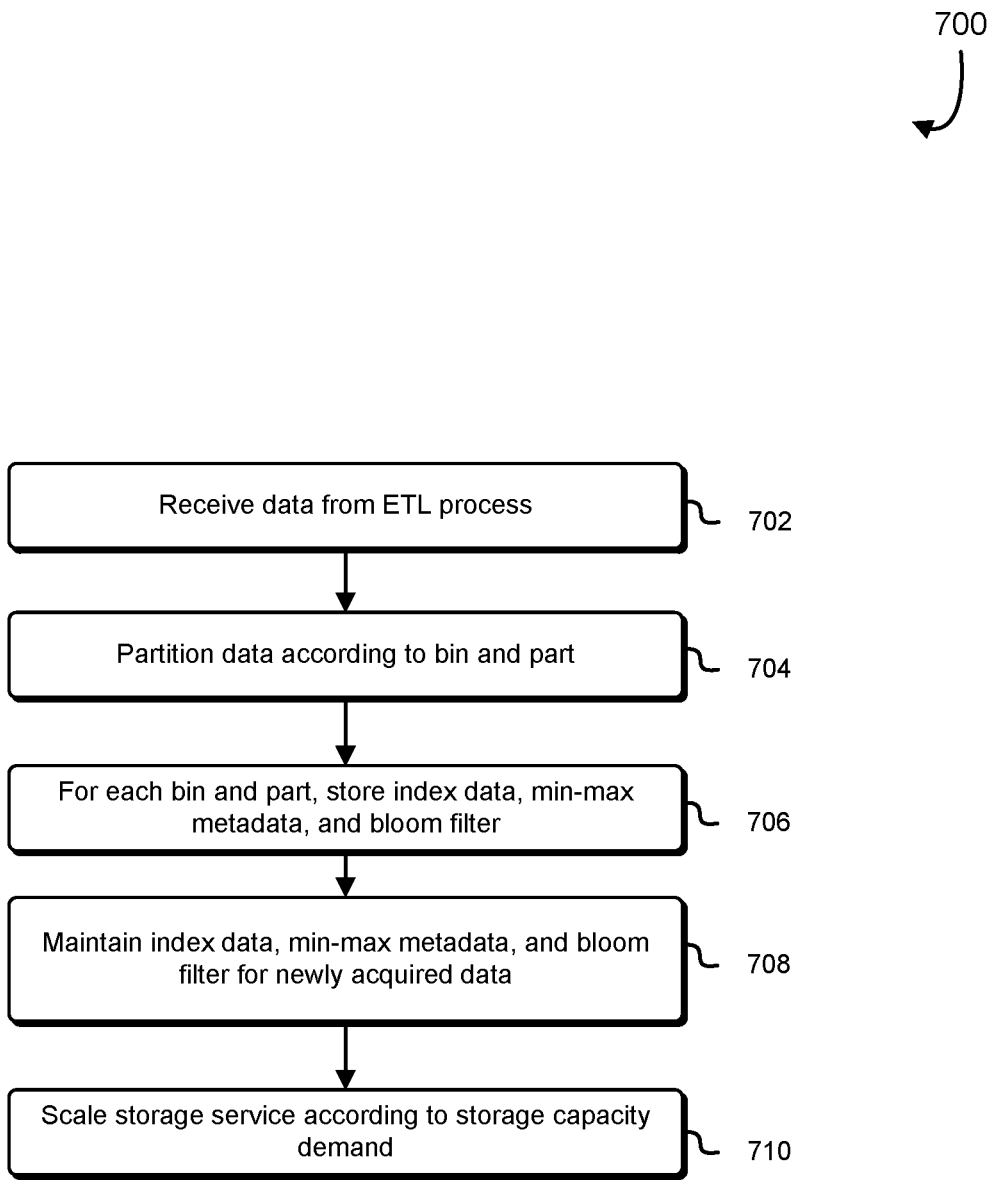
FIG. 7 is a flow diagram depicting an example procedure for maintaining index data on a distributed data storage service.

FIG. 7 is a flow diagram depicting an example procedure for maintaining index data on a distributed data storage service. Although depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In an embodiment, the example process 700 is performed by an indexing service, such as the indexing service 106 depicted in FIG. 1.

At 702, the indexing service receives data points from an ETL process.

At 704, the indexing service partitions data according to bin and part. For example, the indexing service may partition data according to bins defined by time intervals, and further partition the data in each bin according to a part number. Note that in various embodiments, this operation is combined with a storage operation, such as those related to steps 706 or 708. For example, a determination as to which bin and part a data point belongs may be made contemporaneously with an operation to store that data point.

At 706, the indexing service stores data for each bin and part. For example, for a bin "Q1" and part number "P1," the files "Q1.P1.min-max.dat," "Q1.P1.bloom.dat," and "Q1.P1.index.dat" might be generated and stored on the storage device. Alternatively, a file named "Q1.P1.index-data.dat," containing all of the data for that part, can be generated and stored, provided that the distributed data storage service permits portions of a file to be downloaded.

At 708, the indexing service continues to maintain index data, min-max metadata, and bloom filters for newly acquired data. This may, for example, comprise updating or replacing previously stored index data, or adding new index data, to the data stored by the distributed data storage service. Note, however, that various embodiments treat the collection of data as "read-only" during processing of a query.

At 710, the indexing service is scaled according to storage capacity demand. Although depicted as last in the series of depicted steps, this may be performed as needed according to the demand for storage.

Figure 8:
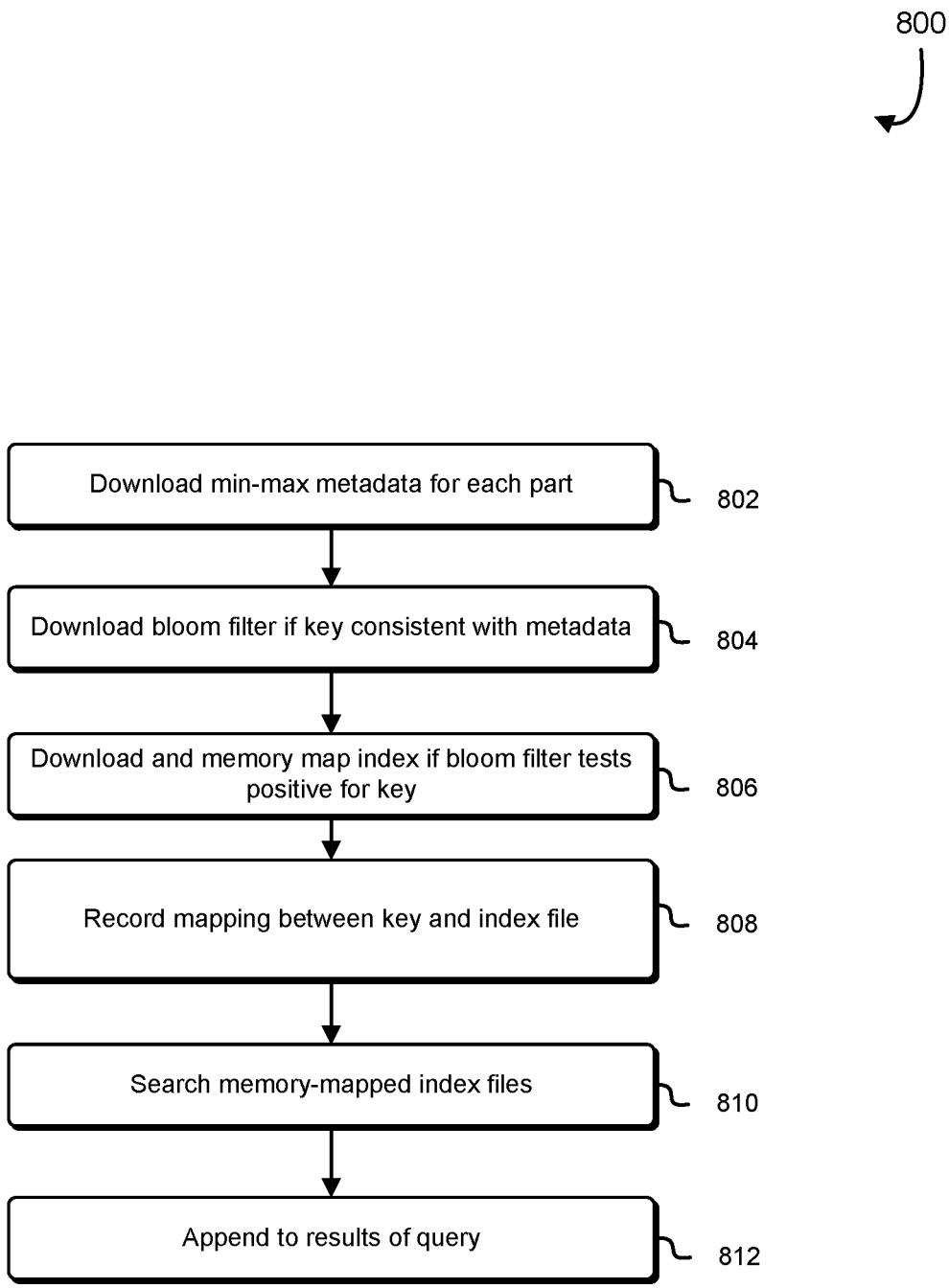
FIG. 8 is a flow diagram depicting an example procedure for processing a point query.

FIG. 8 is a flow diagram depicting an example procedure for processing a point query, using the data files stored by the indexing service. Although depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In an embodiment, the example process 800 is performed by a client library, such as the client library 114 depicted in FIG. 1.

At 802, the client library downloads min-max metadata for each part under consideration in the query. Prior to this step, a directory listing might be obtained to identify which files are available, and to restrict the set of files that need to be considered. For example, if a point query pertains to the time interval "Q2," then only bins and parts pertaining to "Q2" need to be considered.

At 804, the client library compares uses the min-max metadata to determine if a part has data for a range of keys that includes the key specified by the query. If so, the bloom filter for the part is also downloaded. For example, a part whose min-max is [1, 4] might have data relevant to a query for data points associated with k=2, and the client library would proceed to download the corresponding bloom filter for that part.

At 806, if the downloaded bloom filter tests positive for the key, the index file is downloaded. The index file, which may be large, contains the data points for the corresponding part. The use of the min-max metadata and bloom filter allows the client library to avoid downloading index data except where it is likely (though not guaranteed) to have relevant data. The client library also memory-maps the downloaded data into the memory of the query node on which the client library is executing.

At 808, the client library records a mapping between the key and the index file. The mapping may be referred to as a hit cache. The hit cache may, for example, contain records of which index files contain records for which keys, and further contain pointers, references, or other data which allows the local copy of the index file to be accessed.

At 810, the client library searches the memory-mapped index files. The files searched may be limited to those believed to contain data for the relevant key. This may be based on the min-max metadata and the corresponding bloom filter. Alternatively, or in addition, the searched files may be limited based on the hit cache. Searching the memory pages, in various embodiments, is accomplished by locating records corresponding to the key. As these records are found, they are appended to a buffer comprising results of the query. In FIG. 8, this is depicted by step 812.

Figure 9:
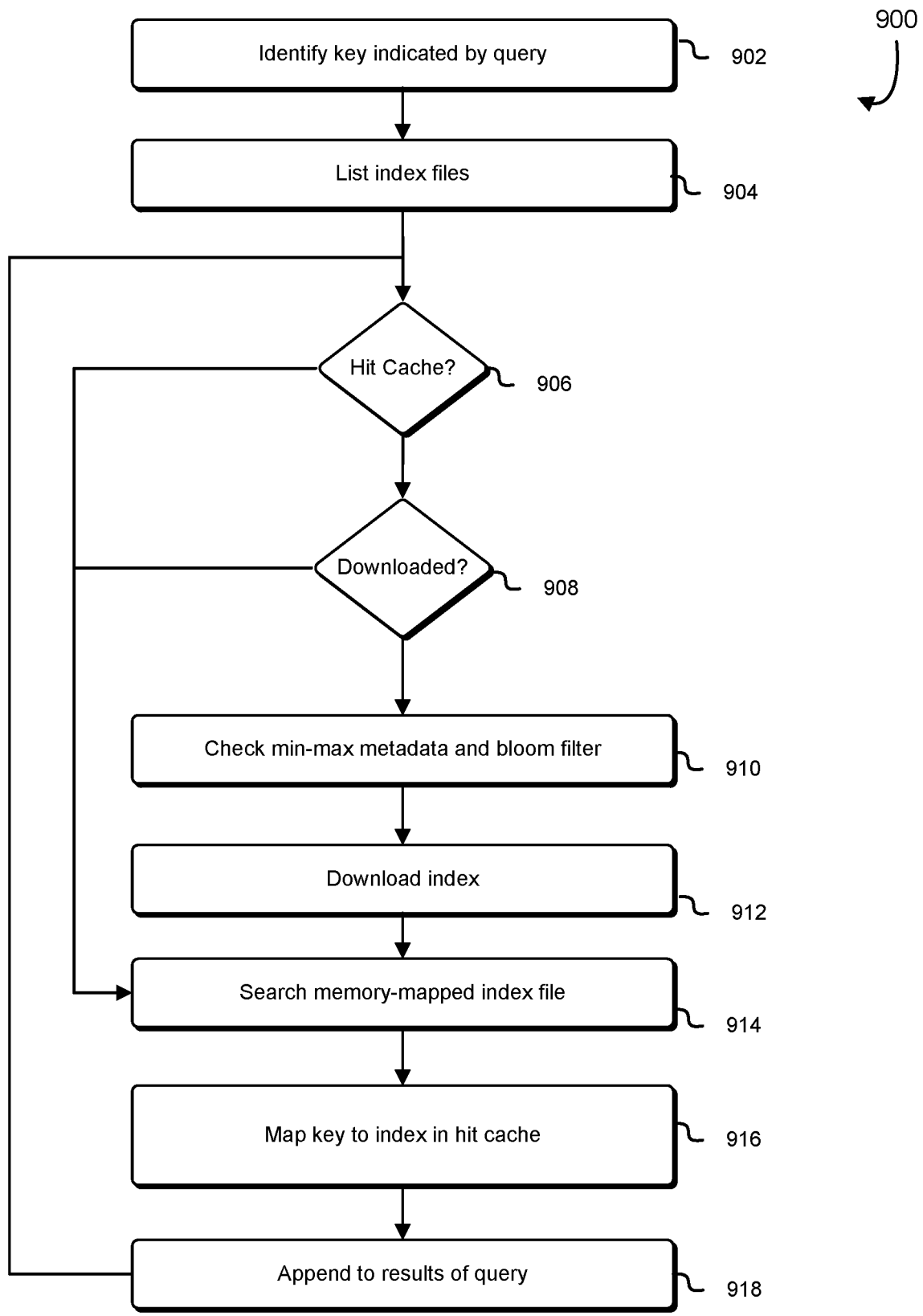
FIG. 9 is a flow diagram depicting an example procedure for further aspects of processing a point query.

FIG. 9 is a flow diagram depicting an example procedure for further aspects of processing a point query. Although depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. In an embodiment, the example process 900 is performed by a client library, such as the client library 114 depicted in FIG. 1.

At 902, the client library identifies the key for a query that is to be processed. The client library may also identify criteria, such as time interval restrictions, that can be used to limit the subset of index files that are to be examined or searched.

At 904, the client library obtains a list of available index files. In some embodiments, the corresponding min-max metadata and bloom filter files are listed as separate files, though they may also be combined with the index files provided that the min-max and bloom filter data is separately downloadable. The client library uses the listing of files, as provided from the distributed data storage service, to determine which files should be examined and possibly downloaded and searched. For example, the information contained in the listing of files may include index name, interval name, and part number. This information may be compared to criteria derived from the query, and based on that comparison identify index files that might contain data relevant to the search. Note that the depicted steps 906-918 may be applied to each of these candidate index files.

At 906, the client library determines whether a candidate index file is described in the hit cache. If so (and assuming the indication is positive—some embodiments may record indications of which index files do not contain data relevant for a key), the client library can proceed to search the index file, at step 914.

Otherwise, the client library proceeds, in an embodiment, to determine whether or not the index file has already been downloaded. In some instances, some of the components related to the index, such as the min-max data or bloom filter, may have been downloaded. In others, the entire index may already be available. This might occur, for example, where the index file was downloaded in relation to another key.

At 910, the client library checks the min-max metadata, and the bloom filter, in order to determine whether the index file might contain data points associated with the key and should be downloaded.

At 912, if the tests of the min-max metadata and bloom filter were positive, the index file is downloaded and memory-mapped. At 916, the client library searches the memory mapped index file to identify data points associated with the key. Data points located in the search are then appended to the results of the query.

The client library may perform various additional steps to assemble the results of the query and provide them to the client of the client library. In some cases, the number of results may be very large. The client library may therefore provide a mechanism for providing the results of the query is manageable units.

As one skilled in the art will appreciate in light of this disclosure, certain embodiments may be capable of achieving certain advantages, including some or all of the following. In various embodiments, the use of a distributed data storage service, rather than conventional storage, allows improved scaling of storage capacity. The distributed data storage service, for example, may provide on-demand upwards or downwards scaling of the amount of available storage. Moreover, the use of the client library in combination with the distributed data storage service allows index searches to be performed by commodity computing devices, even where such devices might not otherwise have the capability of interfacing with storage devices of sufficient capacity. Furthermore, the combination allows storage capacity to be scaled independently of computing capacity. Where more extensive computation is required, the number of compute nodes used to process the query can be scaled upwards, regardless of how much storage capacity is required.

Figure 10:
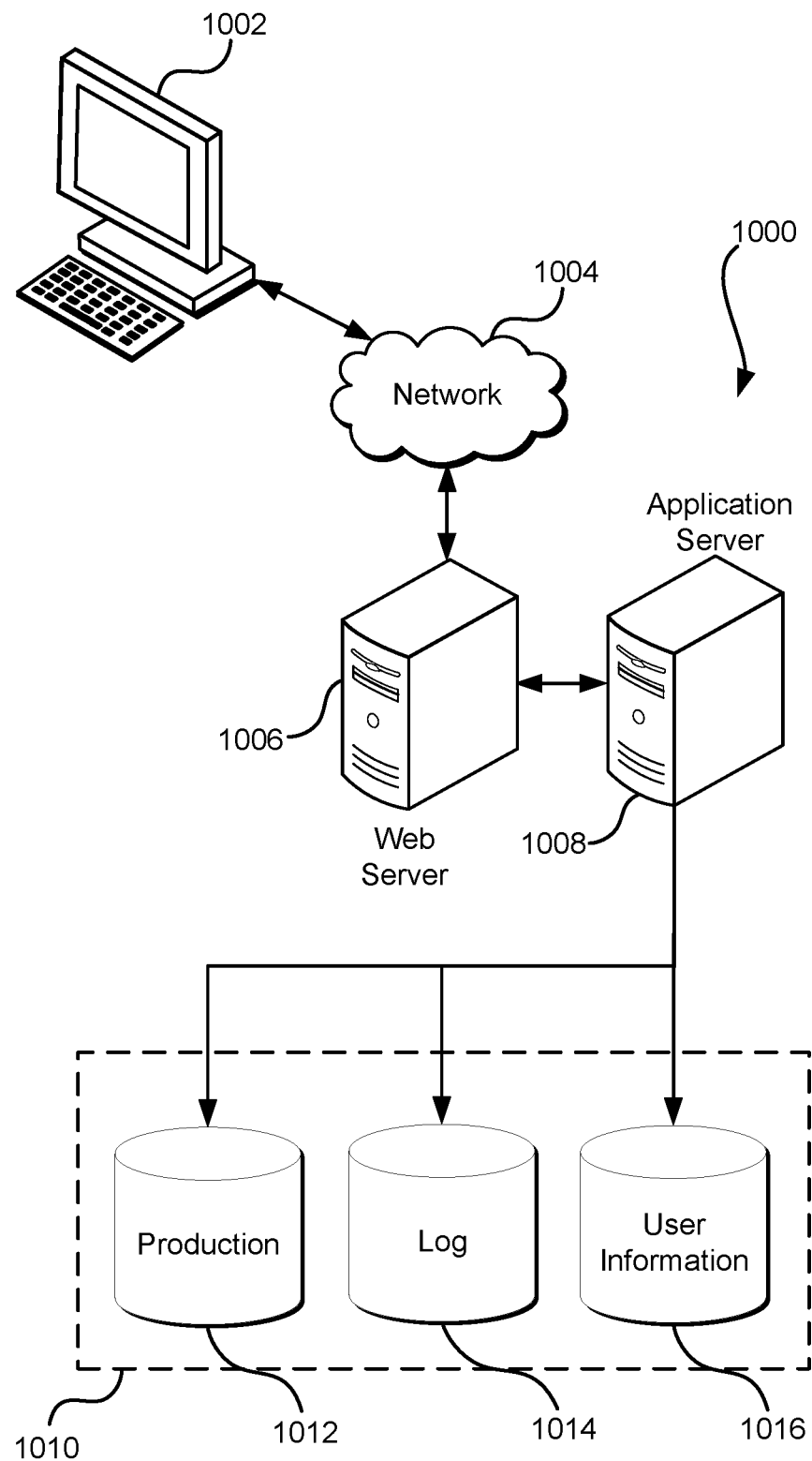
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the electronic client device 1002 comprises a main memory, which refers to the primary storage of the electronic client device 1002. For example, the electronic client device 1002 may comprise random access memory ("RAM") which serves as the primary memory for the device. The electronic client device 1002 may also comprise other non-transitory memories, such as solid-state memories, which may be utilized as components of main memory, or secondary storage. The electronic client device 1002 may also comprise other non-transitory memories not used for primary storage, such as hard drives, solid state hard drives, and so on. The electronic client device 1002 may also comprise at least one processor capable of executing instructions stored on any of the non-transitory memories.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/ or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory having stored thereon instructions that, in response to being executed by the at least one processor, cause the system to at least:
      store, on a distributed data storage service, a file comprising a subset of a plurality of data points, wherein the subset of the plurality of data points is based at least in part on an interval of time;
      store, on the distributed data storage service, information indicative of a range of keys associated with the subset of the plurality of data points stored in the file;
      store, on the distributed data storage service, a data structure indicative of a probability that the subset comprises at least one data point associated with a first key; and
      wherein the file is downloaded from the distributed data storage service to a computing device of a plurality of computing devices in response to a query for data points associated with the first key, the file downloaded based at least in part on the stored information indicative of the range of keys and the data structure indicative of the probability that the file comprises at least one data point associated with the first key, wherein the plurality of computing devices provides computing capacity used to process the query, wherein the computing capacity used to process the query is adjusted independently of capacity used to store index data, wherein the index data comprises the file.

2. The system of claim 1, wherein the computing device responds to the query by at least memory-mapping the file and searching the memory-mapped file for data points associated with the first key.

3. The system of claim 1, wherein the file is identified on the distributed data storage service based at least in part on the time interval and a part number.

4. The system of claim 1, wherein the subset of the plurality of data points corresponds to a partitioning of data points associated with the interval of time.

5. The system of claim 1, wherein content of the file is memory-mapped to a virtual memory region.

6. A computer-implemented method, comprising:
   storing, by a distributed data storage service, a file comprising a subset of a plurality of data points;
   storing information indicative of a range of keys associated with the file;
   storing information indicative of a probability that the file comprises at least one data point associated with a first key; and
   providing, by the distributed data storage service, the file to a computing device of a plurality of computing devices, wherein the computing device requests the file in response to a query of data points associated with the first key, wherein the computing device requests the file based at least in part on inclusion of the first key in the range of keys and based at least in part on the information indicative of the probability that the file comprises at least one data point associated with the first key, wherein the plurality of computing devices provides computing capacity used to process the query, wherein the computing capacity used to process the query is adjusted independently of capacity used to store index data, wherein the index data comprises the file.

7. The computer-implemented method of claim 6, wherein the computing device memory-maps the file and searches the memory-mapped file for data points associated with the key.

8. The computer-implemented method of claim 6, wherein the computing device stores a mapping between the first key and memory-mapped files comprising data points associated with the first key.

9. The computer-implemented method of claim 6, wherein a bloom filter comprises the information indicative of a probability that the file comprises at least one data point associated with a first key.

10. The computer-implemented method of claim 6, further comprising adjusting capacity to process the query independently of adjusting capacity to generate and store index data used to process the query.

11. The computer-implemented method of claim 6, wherein the file is identified on the distributed data storage service based at least in part on an interval of time and a part number.

12. The computer-implemented method of claim 6, wherein the query is processed by a plurality of computing devices, the plurality of computing devices provided as a query processing service.

13. The computer-implemented method of claim 6, further comprising providing a client library, wherein the client library comprises instructions executed on the computing device, the instructions causing the computing device to download the file and search the file for data points associated with the first key.

14. A non-transitory computer-readable storage medium having stored thereon executable instructions that, as a result of being executed by one or more processors of a computer system, cause the computer system to at least:
receive a query for data points associated with a first key;
download, from a distributed data storage service, a file determined to be likely to contain data points associated with the first key, the determination based at least in part on the key being in a range of keys associated with data points in the file and on a data structure indicative of a probability that the file comprises at least one data point associated with the first key, wherein the computer system is one of a plurality of computer systems that provides computing capacity used to process the query, wherein the plurality of computer systems used to process the query is adjusted independently of capacity used to store index data, wherein the index data comprises the file;
memory map the file;
search the memory-mapped file for data points associated with the first key; and
append data points associated with the first key to results of the query.

15. The non-transitory computer-readable storage medium of claim 14, wherein the instructions further comprise instructions that, as a result of being executed by the one or more processors, cause the computer system to:
store information indicative of the file comprising data points associated with the first key.

16. The non-transitory computer-readable storage medium of claim 14, wherein the instructions further comprise instructions that, as a result of being executed by the one or more processors, cause the computer system to:
retrieve a list of a plurality of files stored by a distributed data storage service, wherein each file of the plurality of files is identified based at least in part on an index name, a time interval, and a part number.

17. The non-transitory computer-readable storage medium of claim 14, wherein the instructions further comprise instructions that, as a result of being executed by the one or more processors, cause the computer system to:
determine, based at least in part on metadata associated with the file, that the first key is within the range of keys associated with data points in the file;
download the data structure indicative of the probability that the file comprises at least one data point associated with the first key; and
download the file based at least in part on the probability.

18. The non-transitory computer-readable storage medium of claim 14, wherein the data structure is a probabilistic data structure usable to test set membership.

19. The non-transitory computer-readable storage medium of claim 18, wherein the probabilistic data structure is a bloom filter.

20. The non-transitory computer-readable storage medium of claim 14, wherein one or more pages of the memory mapped file are kept loaded in a main memory of the computing system.

* * * * *